United States Patent
Palecanda

(10) Patent No.: US 7,859,997 B2
(45) Date of Patent: Dec. 28, 2010

(54) PACKET HANDLING ON A NETWORK DEVICE

(75) Inventor: Ponnappa Palecanda, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1513 days.

(21) Appl. No.: 11/139,168

(22) Filed: May 26, 2005

(65) Prior Publication Data

US 2006/0268690 A1 Nov. 30, 2006

(51) Int. Cl.
*H04L 12/26* (2006.01)

(52) U.S. Cl. .................................................. 370/230

(58) Field of Classification Search .............. 370/229, 370/230, 235, 237, 241, 241.1, 248, 351, 370/412–418, 428, 429
See application file for complete search history.

(56) References Cited

U.S. PATENT DOCUMENTS

| 6,631,446 | B1 * | 10/2003 | Cherkauer et al. | 711/134 |
| 6,757,248 | B1 * | 6/2004 | Li et al. | 370/235 |
| 2004/0003069 | A1 * | 1/2004 | Wong | 709/223 |
| 2004/0218617 | A1 * | 11/2004 | Sagfors | 370/412 |
| 2005/0030893 | A1 * | 2/2005 | Dropps et al. | 370/229 |
| 2005/0073956 | A1 * | 4/2005 | Moores et al. | 370/235 |
| 2005/0113086 | A1 * | 5/2005 | Wilson | 455/432.2 |
| 2006/0010243 | A1 * | 1/2006 | DuRee | 709/230 |

\* cited by examiner

*Primary Examiner*—Derrick W Ferris
*Assistant Examiner*—Omar Ghowrwal

(57) ABSTRACT

Methods for handling packets received at a network device are described. The packets are placed into a queue that contains packets of a first type and packets of a second type. The packets of the first type include protocol packets, and the packets of the second type include packets other than protocol packets. A first count is incremented when the queue is full. A packet of the second type is forwarded for processing provided that the first count satisfies a condition; otherwise, the packet of the second type is discarded.

26 Claims, 3 Drawing Sheets

PACKET HANDLING ON A NETWORK DEVICE

TECHNICAL FIELD

Embodiments of the present invention relate to network devices (such as, but not limited to, switches and routers).

BACKGROUND ART

Packets received at network devices—such as routers or switches—include packets that can be characterized as protocol packets and packets that can be characterized as packets that help the network device learn new destinations (referred to herein as "learn packets").

To assist in making routing decisions, a network device builds routing tables that store information that identifies routes to other devices and networks (generally speaking). Routing protocols are used to determine the contents of the routing tables. When a learn packet is received, the network device determines whether there is an entry in a routing table that identifies a path to the destination of the learn packet. If not, software is executed that determines a path to that destination, and programs the routing table and appropriate hardware with that path. This is a processor-intensive process.

A protocol packet, on the other hand, is for carrying information that helps a routing protocol function properly. A dynamic routing protocol may use protocol packets to send and receive information for maintaining and updating the routing tables, for example. Relative to learn packets, protocol packets are generally considered to be of greater importance.

Both protocol and learn packets are processed using software that is executed on the network device. The packets are forwarded by the receiving hardware to memory locations that can be addressed by the software. The packets are placed in a fixed-length queue that the software reads sequentially. As packets are read from the queue, new packets can be added to the queue. If the number of packets arriving at the network device exceeds the capacity of the processing resources of the device, then the queue may fill up. Arriving packets that cannot be added to the queue because of lack of space in the queue are dropped.

In some situations, particularly in situations resulting from a virus or a denial-of-service attack, the number of learn packets may increase dramatically. This can result in the queue filling and staying filled, so that subsequent packets—whether protocol packets or learn packets—are dropped before they are processed. The larger share of learn packets can also overwhelm the processing resources of the network device, causing the device to operate slower and perhaps even causing the device to crash.

It is desirable that the availability and capacity of network devices be as high as practical, even under high stress conditions. Accordingly, a method that can improve the performance of a network device or at least increase the likelihood that the device will remain functional, in particular under high stress conditions, would be of value. A method that can accomplish this without substantially increasing the processing load on the network device would also be of value. Embodiments of the present invention provide a novel solution that provides these and other advantages.

DISCLOSURE OF THE INVENTION

Embodiments of the present invention pertain to the handling of packets received at a network device. In one embodiment, the packets are placed into a queue that contains packets of a first type and packets of a second type. The packets of the first type include protocol packets, and the packets of the second type include packets other than protocol packets. A first count is incremented when the queue is full. A packet of the second type is forwarded for processing provided that the first count satisfies a condition; otherwise, the packet of the second type is discarded.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
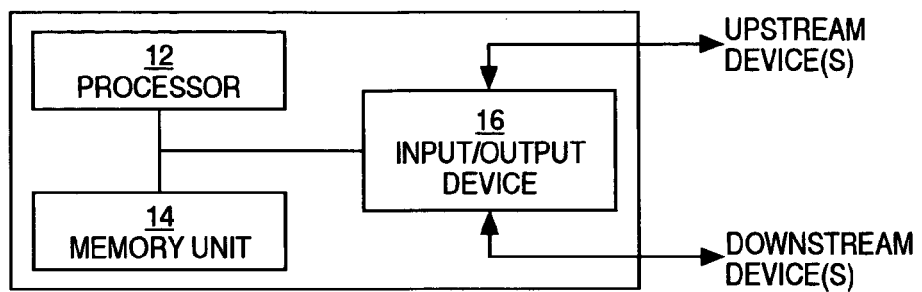
FIG. 1 is a block diagram showing elements of a device upon which embodiments of the present invention can be implemented.

FIG. 1 is a block diagram showing elements of an intelligent device 10 (e.g., a device having elements of a computer system) upon which embodiments of the present invention can be implemented. In one embodiment, device 10 is a switch. In another embodiment, device 10 is a router. In general, device 10 is a device used for moving information (e.g., packets) along a path in a network, and may be referred to herein as a network device. In general, device 10 comprises a processor 12 for processing information and instructions, a memory unit 14 for storing information and instructions for processor 12, and an input/output device 16, which provides a communication link between upstream nodes and downstream nodes in a network. It is appreciated that device 10 may include elements in addition to or other than the elements illustrated by FIG. 1.

Figure 2:
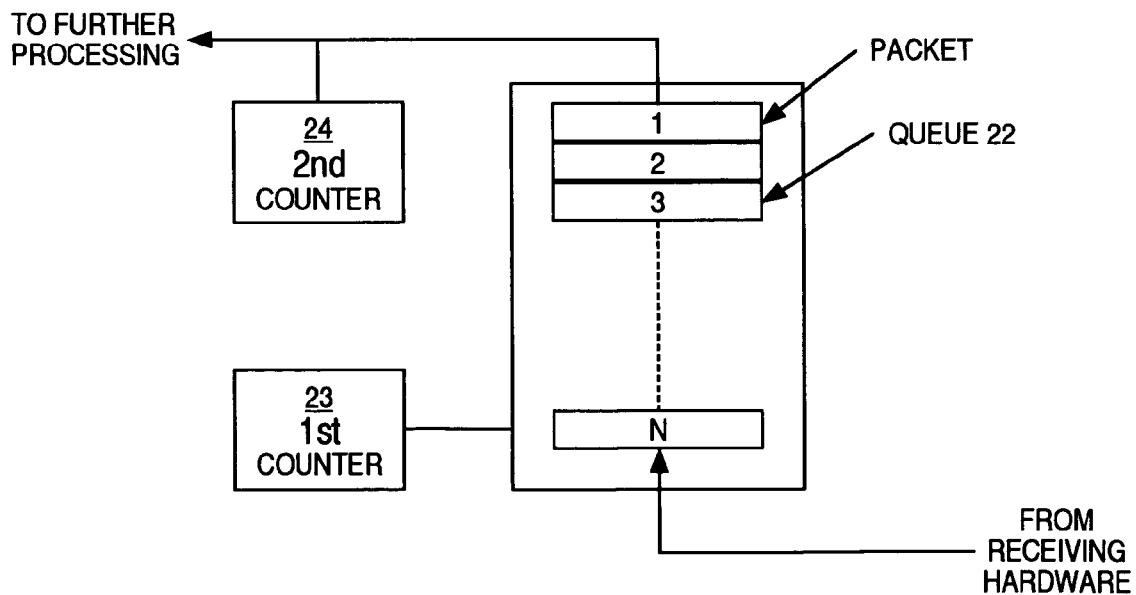
FIG. 2 is a block diagram showing the flow of packets in a device according to one embodiment of the present invention.

FIG. 2 is a block diagram showing the flow of packets in a device (e.g., device 10 of FIG. 1) according to one embodiment of the present invention. In the example of FIG. 2, packets 1, 2, 3, ..., N are received at the device and, if queue 22 is not full, the packets are placed in queue 22 in the order in which they are received. Although a single queue is illustrated and described, embodiments in accordance with the present invention are not so limited.

In one embodiment, packets 1, 2, 3, ..., N include protocol packets (which may be referred to as routing protocol packets) and learn packets, which have been described previously herein. However, embodiments of the present invention are not limited to use with these types of packets. Furthermore, embodiments of the present invention can be used when there are more than two types of packets. Also, the packets (e.g., the learn packets) may be unicast (e.g., directed) packets or multicast (e.g., broadcast) packets.

Continuing with reference to FIG. 2, first counter 23 is for counting the number of times that queue 22 is full. In particular, in one embodiment, first counter 23 maintains a count of the number of contiguous times that queue 22 is full. Additional information is provided in conjunction with FIGS. 3 and 4.

Packets are read from queue 22 of FIG. 2 for further processing. In one embodiment, a count of learn packets that are read from queue 22 is maintained by second counter 24. Learn packets can be distinguished from protocol packets using methods known in the art. A learn packet is, in one embodiment, a packet that is associated with Layer 3 of the Open Systems Interconnection (OSI) model generally associated with the Internet Protocol (IP). Also, protocol packets typically have preprogrammed MAC (media access control) addresses. Thus, a protocol packet can be recognized by its MAC address, and a learn packet can be identified as being other than a protocol packet.

Figure 3:
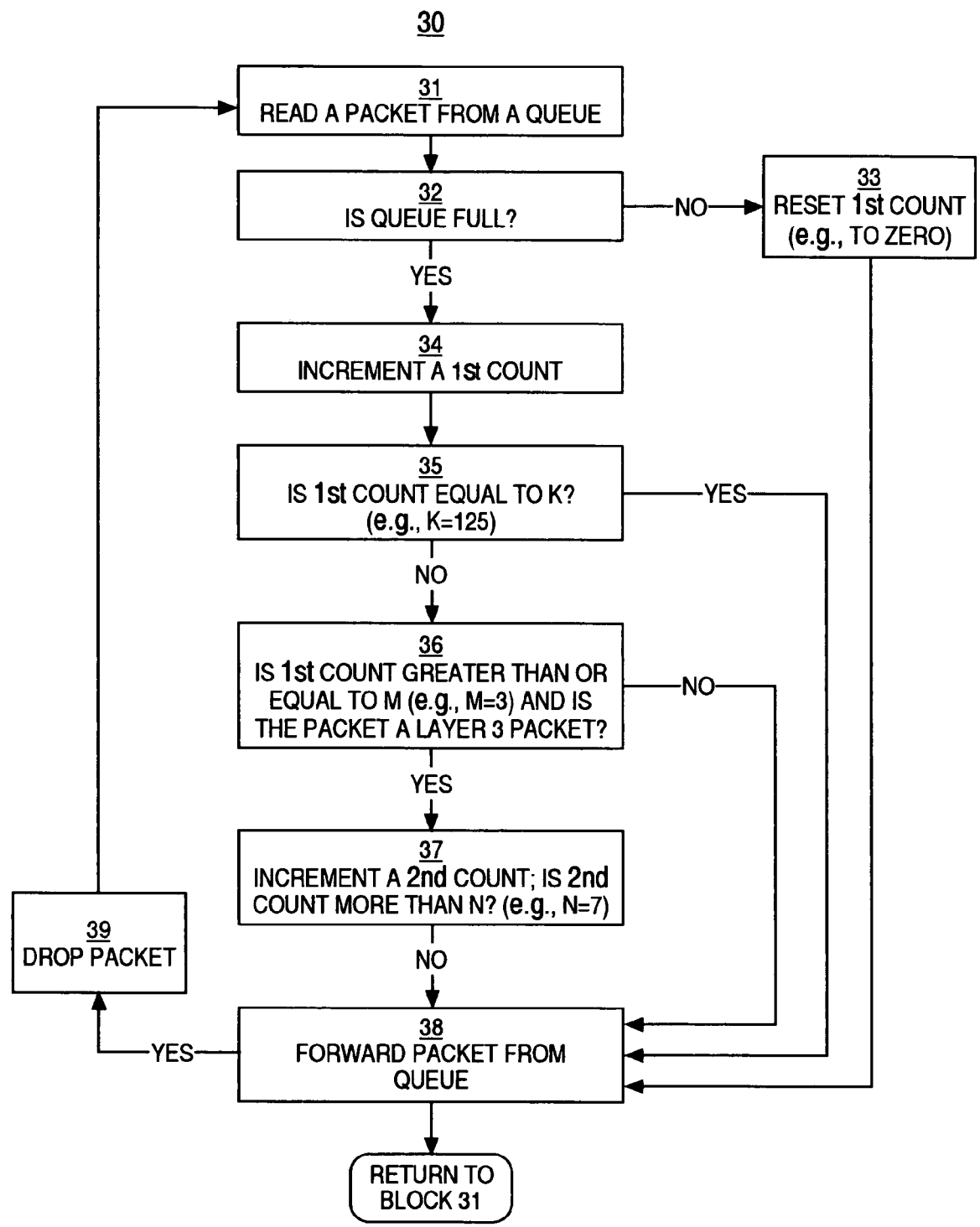
FIG. 3 is a flowchart of a method for handling packets according to an embodiment of the present invention.
Figure 4:
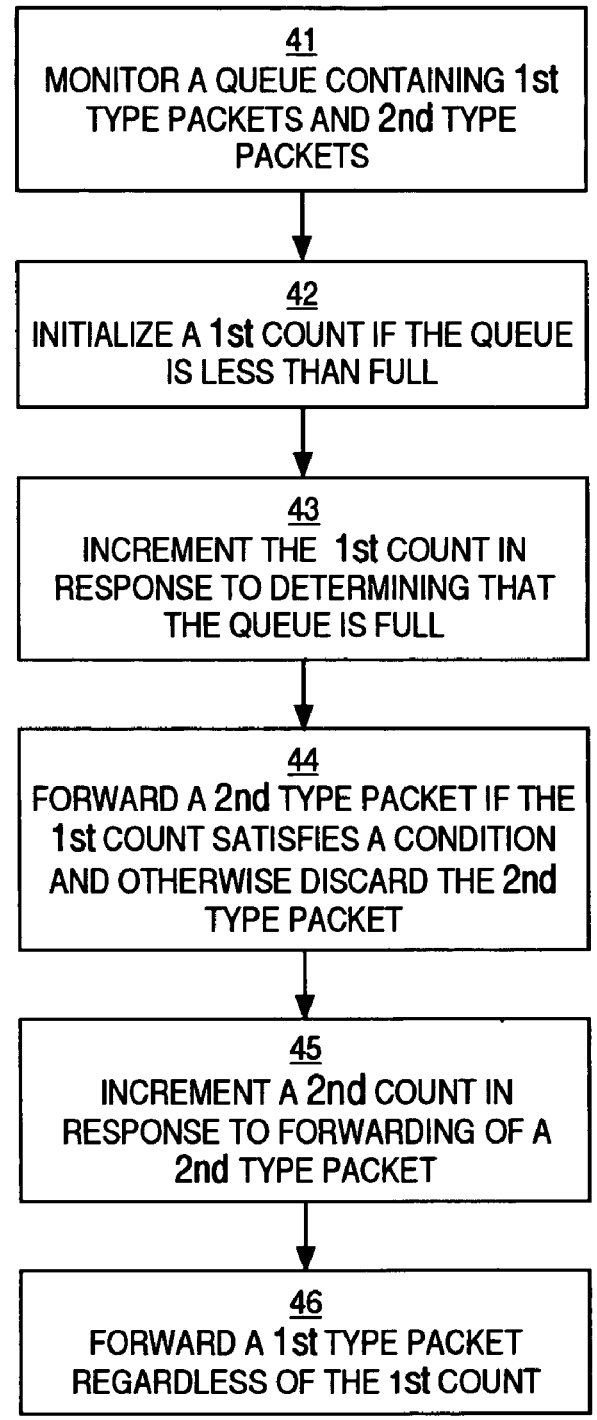
FIG. 4 is a flowchart of a method for handling packets according to another embodiment of the present invention.

FIG. 3 is a flowchart 30 of a method for handling packets according to an embodiment of the present invention. FIG. 4 is a flowchart 40 of a method for handling packets according to another embodiment of the present invention. Although specific steps are disclosed in flowcharts 30 and 40, such steps are exemplary. That is, embodiments of the present invention are well-suited to performing various other steps or variations of the steps recited in flowcharts 30 and 40. It is appreciated that the steps in flowcharts 30 and 40 may be performed in an order different than presented, and that not all of the steps in flowcharts 30 and 40 may be performed. In one embodiment, flowcharts 30 and 40 include processes of the present invention which, in one embodiment, are carried out by a processor under the control of computer-readable and computer-executable instructions. The computer-readable and computer-executable instructions reside, for example, in non-transitory data storage features such as memory unit 14 of FIG. 1. The computer-readable and computer-executable instructions are used to control or operate in conjunction with, for example, processor 12 of FIG. 1.

For simplicity, flowcharts 30 and 40 are described in the context of a single queue. However, embodiments in accordance with the present invention can be extended to multiple queues. When there are multiple queues, the packets can be placed into any of the queues, and read from those queues, using a variety of schemes. For example, if there are multiple queues, the queues can be stored and read in a round-robin fashion.

Embodiments in accordance with the present invention are described in the context of protocol packets and learn packets, which have been described previously herein. However, embodiments in accordance with the present invention are not limited to use with these types of packets. Furthermore, embodiments in accordance with the present invention can be used when there are more than two types of packets.

As will be seen, in one embodiment, a feature of the present invention is the capability to bias packet processing toward the processing of protocol packets, so that (under certain conditions) more protocol packets are processed, although at the expense of learn packets. In general, this feature can be applied so that processing favors any type of packet over any other type or types of packets. Furthermore, this feature can be extended to bias processing toward multiple types of packets. That is, packet processing can be biased toward a class of packets that consists of more than one type of packet.

With reference to FIG. 3, packets that are received at a device (e.g., device 10 of FIG. 1) are placed into a queue (e.g., queue 22 of FIG. 2). In block 31, a packet is read from the queue. The packet read from queue 22 may be a learn packet or it may be a protocol packet.

In block 32 of FIG. 3, a determination is made as to whether or not the queue is full. Even though a packet is read from the queue, another packet may be immediately added to the queue, so that if the queue is full it will remain full. Also, as mentioned above, block 32 does not necessarily follow block 31; instead, block 32 may occur before block 31. If the queue is full, flowchart 30 proceeds to block 34; otherwise, flowchart 30 proceeds to block 33.

In block 33, if the queue is not full, a first count (e.g., the count maintained by first counter 23 of FIG. 2) is initialized. That is, the count is reset to its initial value (e.g., a value of zero). From block 33, flowchart 30 proceeds to block 38.

In block 34 of FIG. 3, in one embodiment, if the queue is full, the first count is incremented (e.g., increased by one unit).

In block 35, in one embodiment, a determination is made as to whether or not the first count is equal to a first value K. The value of K imposes a maximum on the first count. In one such embodiment, K is equal to 125; however, the present invention is not so limited. If the first count is equal to K, flowchart 30 proceeds to block 38; otherwise, flowchart 30 proceeds to block 36.

In block 36, in one embodiment, a determination is made as to whether or not the first count is greater than or equal to a second value M. The value of M imposes a minimum on the first count. In one such embodiment, M is equal to three (3); however, the present invention is not so limited. Also in block 36, a determination is made as to whether the packet is other than a protocol packet. Specifically, in one embodiment, a determination is made as to whether the packet is a learn packet. If the first count is less than M and/or if the packet is a protocol packet, then flowchart 30 proceeds to block 38. If the first count is greater than or equal to M and if the packet is other than a protocol packet (that is, both conditions are satisfied), then flowchart 30 proceeds to block 37.

In block 37, in one embodiment, a second count (e.g., the count maintained by second counter 24 of FIG. 2) is incremented (e.g., increased by one unit). In one such embodiment, a determination is made as to whether or not the second count is more than a third value N. The value of N imposes a maximum on the second count. In one embodiment, N is equal to seven (7), although the present invention is not so limited. If the second count is more than N, flowchart 30 proceeds to block 39; otherwise, flowchart 30 proceeds to block 38.

In block 38 of FIG. 3, the packet is forwarded from the queue, typically for further processing.

In block 39, the packet is discarded (e.g., dropped) and is not further processed. From blocks 38 and 39, flowchart 30 returns to block 31.

In practice, in one embodiment, flowchart 30 results in packet processing being biased toward the processing of protocol packets if the queue is filled a certain number of contiguous times (e.g., 3 or more times with M equal to 3, but less than 125 times with K equal to 125). Looking again at FIG. 3, a learn packet and a protocol packet are handled the same through at least block 35.

At block 35, if the queue has remained filled for the specified maximum number of contiguous times (e.g., 125 times with K equal to 125), then the packet (whether a learn packet or a protocol packet) is forwarded from the queue. That is, if the first count is equal to K, then either type of packet (whether a learn packet or a protocol packet) is forwarded from the queue. If, however, the queue has not remained filled for the specified maximum number of contiguous times (e.g., the first count is less than 125 with K equal to 125), then the handling of the packet proceeds to block 36.

At block 36, if the queue has been filled less than the specified minimum number of contiguous times (e.g., the first count is less than 3 with M equal to 3), then either type of packet (whether a learn packet or a protocol packet) is forwarded from the queue. That is, if the first count is less than or equal to M, then the handling of either type of packet proceeds from block 36 to block 38.

However, at block 36, if the queue has remained filled a specified minimum number of times (e.g., the first count is 3 or more with M equal to 3), then only the handling of protocol packets proceeds from block 36 to block 38. That is, at block 36, only protocol packets are forwarded from the queue if the first count is greater than or equal to M.

Block 37 thus pertains only to the handling of learn packets. At block 37, with the first count greater than or equal to M but less than K, the first N (e.g., 7) learn packets are forwarded from the queue. After the first N learn packets are forwarded from the queue, subsequent learn packets are discarded until the first count either is reset to its initial value (e.g., when the queue is no longer filled) or until the first count equals K (e.g., 125).

In general, according to one embodiment of the present invention, both protocol and learn packets are forwarded from the queue if the queue is not filled, if the queue has been contiguously filled less than M times, or if the queue has been contiguously filled K times. If the queue has been filled M times or more, then only protocol packets and the first N learn packets are forwarded from the queue; after N learn packets are forwarded from the queue, then only protocol packets are forwarded from the queue. Thus, under certain conditions, protocol packets are forwarded for processing at the expense of learn packets, so that routing protocols can continue to function properly. However, under certain other conditions, the processing of learn packets is permitted, so that the network device can continue to learn at least some new destinations.

In essence, flowchart 30 describes a process in which, under certain conditions, learn packets are filtered from the queue and discarded. Significantly, implementation of the process of flowchart 30 does not consume a significant amount of the processing resources of the network device. Also, with implementation of the process of flowchart 30, the network device is expected to remain functional under high stress conditions (such as conditions induced by a virus or a denial-of-service attack that increase the number of learn packets) because the processing resources of the device will not be overwhelmed by the larger share of learn packets.

With reference now to FIG. 4, in block 41, a queue (e.g., queue 22 of FIG. 2) containing packets of a first type and packets of a second type is monitored. In one embodiment, the packets of the first type include protocol packets and the packets of the second type include packets other than protocol packets (e.g., learn packets).

In block 42 of FIG. 4, a first count (e.g., the count maintained by counter 23 of FIG. 2) is initialized (e.g., set to zero) upon determining that the queue is less than full.

In block 43 of FIG. 4, the first count is incremented upon determining that the queue is full.

In block 44, a packet of the second type (e.g., a learn packet) is forwarded from the queue provided that the first count satisfies a condition. Otherwise, the packet of the second type is discarded.

In one embodiment, the condition of block 44 is satisfied provided that the first count is equal to a first value (e.g., the value of K). The first value (K) establishes a maximum number of contiguous times the queue needs to be filled before a packet of the second type (e.g., a learn packet) can be forwarded from the queue. That is, if the first count is less than K, then packets of the second type are discarded, but once the first count reaches the value of K, packets of the second type are forwarded from the queue. In one embodiment, K is equal to 125; however, a different value for K can be used. Furthermore, the value of K is dynamic; that is, it is configurable or tunable from one value to another depending on, for example, the performance of the network device.

In one embodiment, the condition of block 44 is satisfied provided that the first count is less than a second value (e.g., the value of M). The second value (M) establishes a minimum number of contiguous times the queue needs to be filled before a packet of the second type can be discarded. That is, if the first count is less than M, then packets of the second type are forwarded from the queue, but if the first count is greater than or equal to M, then packets of the second type may be discarded. In one embodiment, M is equal to 3; however, a different value for M can be used. Furthermore, the value of M is dynamic; that is, it is configurable or tunable from one value to another depending on, for example, the performance of the network device.

In block 45, in one embodiment, a second count is incremented when a packet of the second type (e.g., a learn packet) is forwarded from the queue. In such an embodiment, the condition of block 44 is satisfied provided that the second count is less than a third value (e.g., the value of N) if the first count is less than a first value (K) but not less than a second value (M). The third value (N) establishes a maximum number of packets of the second type that can be forwarded from the queue when the first count is greater than or equal to the second value (M) though less than the first value (K). That is, in one embodiment, a packet of the second type can be forwarded from the queue if the first count is greater than or equal to M (but less than K) and the second count is less than N. In one embodiment, N is equal to 7; however, a different value for N can be used. Furthermore, the value of N is dynamic; that is, it is configurable or tunable from one value to another depending on, for example, the performance of the network device.

In block 46, a packet of the first type (e.g., a protocol packet) is forwarded from the queue independent of the value of the first count.

In summary, embodiments in accordance with the present invention can improve the availability and capacity of network devices (e.g., switches and routers), even under high stress conditions. Accordingly, the performance of network devices is improved, and the likelihood that the devices will remain functional is increased, in particular under high stress conditions. Furthermore, these advantages are achieved without substantially increasing the processing load on the network devices. As an added advantage, because embodiments in accordance with the present invention can be implemented in software, the present invention can be implemented in legacy devices by updating the software in such devices.

Embodiments of the present invention are thus described. While the present invention has been described in particular embodiments, it should be appreciated that the present invention should not be construed as limited by such embodiments, but rather construed according to the following claims.

What is claimed is:

1. A method of handling packets received at a network device, said method comprising:

monitoring a queue containing packets of a first type and packets of a second type, said packets of said first type comprising protocol packets and said packets of said second type comprising learn packets, wherein said protocol packets are packets carrying information used by a routing protocol to route packets according to the routing protocol, and wherein learn packets are packets that are used by a network device to learn new destinations;

incrementing a first count in response to determining that said queue is full, wherein a packet of said second type is forwarded from said queue provided that said first count satisfies a condition and otherwise said packet of said second type is discarded, wherein further said condition is tunable; and incrementing a second count in response to forwarding of said packet of said second type for processing.

2. The method of claim 1 further comprising initializing said first count in response to determining that said queue is less than full.

3. The method of claim 2 wherein said condition is satisfied provided that said first count is equal to a first value, said first value establishing a maximum number of contiguous times said queue is filled before said packet of said second type can be forwarded from said queue.

4. The method of claim 2 wherein said condition is satisfied provided that said first count is less than a second value, said second value establishing a minimum number of contiguous times said queue is filled before said packet of said second type can be discarded.

5. The method of claim 2 wherein said condition is satisfied provided that said second count is less than a third value if said first count is less than a first value but not less than a second value, said first value establishing a maximum number of contiguous times said queue is filled before said packet of said second type can be forwarded from said queue, said second value establishing a minimum number of contiguous times said queue is filled before said packet of said second type can be discarded, and said third value establishing a maximum number of packets of said second type that can be forwarded from said queue when said first count is greater than or equal to said second value but less than said first value.

6. The method of claim 1 further comprising forwarding a packet of said first type from said queue independent of a value of said first count.

7. The method of claim 1 wherein said network device is selected from the group consisting of a router and a switch.

8. The method of claim 1 wherein said packets of said second type comprise network layer packets associated with layer 3 of the Open Systems Interconnection model.

9. A device comprising:

a processor;

a communication interface coupled to said processor for receiving packets from a network, said packets comprising packets of a first type and packets of a second type, said packets of said first type comprising protocol packets and said packets of said second type comprising learn packets, wherein said protocol packets are packets carrying information used by a routing protocol to route packets according to the routing protocol, and wherein learn packets are packets that are used by a network device to learn new destinations, wherein said packets are placed into a queue; and a memory unit coupled to said processor, said memory unit containing instructions that when executed implement a method for handling said packets, said method comprising:

incrementing a first count in response to determining that said queue is full;

identifying a packet read from said queue as a packet of said second type;

processing said packet of said second type if said first count satisfies a condition and otherwise discarding said packet of said second type; and incrementing a second count in response to forwarding of said packet of said second type for processing.

10. The device of claim 9 wherein said method further comprises initializing said first count in response to determining that said queue is less than full.

11. The device of claim 10 wherein said condition is satisfied provided that said first count is equal to a first value, said first value establishing a maximum number of contiguous times said queue is filled before said packet of said second type can be processed.

12. The device of claim 10 wherein said condition is satisfied provided that said first count is less than a second value, said second value establishing a minimum number of contiguous times said queue is filled before said packet of said second type can be discarded.

13. The device of claim 10 wherein said condition is satisfied provided that said second count is less than a third value if said first count is less than a first value but not less than a second value, said first value establishing a maximum number of contiguous times said queue is filled before said packet of said second type can be forwarded from said queue, said second value establishing a minimum number of contiguous times said queue is filled before said packet of said second type can be discarded, and said third value establishing a maximum number of packets of said second type that can be forwarded from said queue when said first count is greater than or equal to said second value but less than said first value.

14. The device of claim 9 wherein said method further comprises processing a packet of said first type independent of a value of said first count.

15. The device of claim 9 wherein said condition is changeable.

16. The device of claim 9 wherein said device is selected from the group consisting of a router and a switch.

17. The device of claim 9 wherein said packets of said second type comprise network layer packets associated with layer 3 of the Open Systems Interconnection model.

18. A non-transitory computer-readable data storage having computer-readable program code embodied therein for causing a device to perform a method of handling packets received at said device, said method comprising:

monitoring a queue containing packets of a first type and packets of a second type, said packets of said first type comprising protocol packets and said packets of said second type comprising learn packets, wherein said protocol packets are packets carrying information used by a routing protocol to route packets according to the routing protocol, and wherein learn packets are packets that are used by a network device to learn new destinations;

incrementing a first count in response to determining that said queue is full;

permitting a packet of said second type to be forwarded from said queue provided that said first count satisfies a first condition and provided that a second count satisfies a second condition, said second condition establishing a maximum number of packets of said second type that can be forwarded when said first condition is satisfied, wherein said packet of said second type is discarded if said first and second conditions are not satisfied; and incrementing a second count in response to forwarding of said packet of said second type for processing.

19. The computer-readable data storage of claim 18 wherein said method further comprises initializing said first count in response to determining that said queue is less than full.

20. The computer-readable data storage of claim 19 wherein said first condition is satisfied provided that said first count is equal to a first value, said first value establishing a maximum number of contiguous times said queue is filled before said packet of said second type can be forwarded from said queue.

21. The computer-readable data storage of claim 19 wherein said first condition is satisfied provided that said first count is less than a second value, said second value establishing a minimum number of contiguous times said queue is filled before said packet of said second type can be discarded.

22. The computer-readable data storage of claim 19 wherein said second condition is satisfied provided that said second count is less than a third value, said third value establishing a maximum number of packets of said second type that can be forwarded from said queue when said first count is less than a first value but not less than a second value.

23. The computer-readable data storage of claim 18 wherein a packet of said first type is forwarded from said queue independent of a value of said first count.

24. The computer-readable data storage of claim 18 wherein said network device is selected from the group consisting of a router and a switch.

25. The computer-readable data storage of claim 18 wherein said packets of said second type comprise network layer packets associated with layer 3 of the Open Systems Interconnection model.

26. The computer-readable data storage of claim 18 wherein said first and second conditions are changeable.

* * * * *